(12) United States Patent
Mazumdar

(10) Patent No.: US 9,272,677 B2
(45) Date of Patent: Mar. 1, 2016

(54) SYSTEM AND METHOD FOR PROVIDING AUXILIARY POWER BY REGENERATION POWER MANAGEMENT IN MOBILE MINING EQUIPMENT

(71) Applicant: Siemens Industry, Inc., Alpharetta, GA (US)

(72) Inventor: Joy Mazumdar, Norcross, GA (US)

(73) Assignee: SIEMENS INDUSTRY, INC, Alpharetta, GA (US)

( * ) Notice: Subject to any disclaimer, the term of this patent is extended or adjusted under 35 U.S.C. 154(b) by 118 days.

(21) Appl. No.: 14/210,545

(22) Filed: Mar. 14, 2014

(65) Prior Publication Data

US 2014/0225429 A1    Aug. 14, 2014

Related U.S. Application Data

(63) Continuation of application No. 13/033,898, filed on Feb. 24, 2011, now Pat. No. 8,698,437, which is a continuation-in-part of application No. 12/466,722, filed on May 15, 2009, now Pat. No. 8,174,225.

(51) Int. Cl.
| | |
|---|---|
| *B60R 16/033* | (2006.01) |
| *B60L 11/00* | (2006.01) |
| *E02F 3/30* | (2006.01) |
| *E02F 9/20* | (2006.01) |
| *H02P 5/74* | (2006.01) |
| *B60W 10/30* | (2006.01) |

(52) U.S. Cl.
CPC ............ *B60R 16/033* (2013.01); *B60L 11/005* (2013.01); *E02F 3/304* (2013.01); *E02F 9/207* (2013.01); *E02F 9/2075* (2013.01); *E02F 9/2091* (2013.01); *H02P 5/74* (2013.01); *B60L 2200/40* (2013.01); *B60W 10/30* (2013.01); *Y02T 10/642* (2013.01); *Y02T 10/7022* (2013.01)

(58) Field of Classification Search
CPC ......... H02P 31/00; E02D 17/00; E02F 9/207; E02F 9/2091
USPC .......... 318/430–434, 440–442, 478–479, 490
See application file for complete search history.

(56) References Cited

U.S. PATENT DOCUMENTS

| | | | |
|---|---|---|---|
| 4,263,535 A | 4/1981 | Jones | |
| 6,497,974 B2 * | 12/2002 | Fuglevand | ........ H01M 8/04298 320/167 |
| 7,252,165 B1 | 8/2007 | Gruenwald et al. | |
| 7,696,729 B2 * | 4/2010 | Shiue | ....................... B60K 6/28 320/166 |
| 8,179,103 B2 * | 5/2012 | Doljack | .............. F02N 11/0866 320/104 |
| 8,419,590 B2 | 4/2013 | Falkenstein | |
| 2010/0289443 A1 | 11/2010 | Mazumdar et al. | |

FOREIGN PATENT DOCUMENTS

CN   101516702 A   8/2009

* cited by examiner

*Primary Examiner* — Bentsu Ro

(57) ABSTRACT

A method for operating an ultracapacitor system used in a mining excavator powered by an power source. The method includes detecting whether a power from the power source is present. Next, a voltage level of the ultracapacitor system is measured if the power is not present. The measured voltage level is then compared with a minimum voltage level for the ultracapacitor system. If the measured voltage level is more than the minimum voltage level, auxiliary power is supplied from the ultracapacitor system to operate mining excavator systems. The auxiliary power may be used to power electronic systems and components such as computers, displays, control systems, gas insulated switchgear and lighting systems.

20 Claims, 16 Drawing Sheets

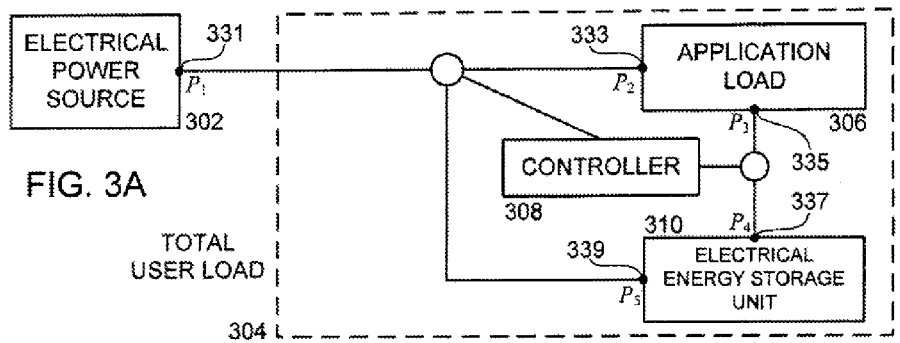
FIG. 3A
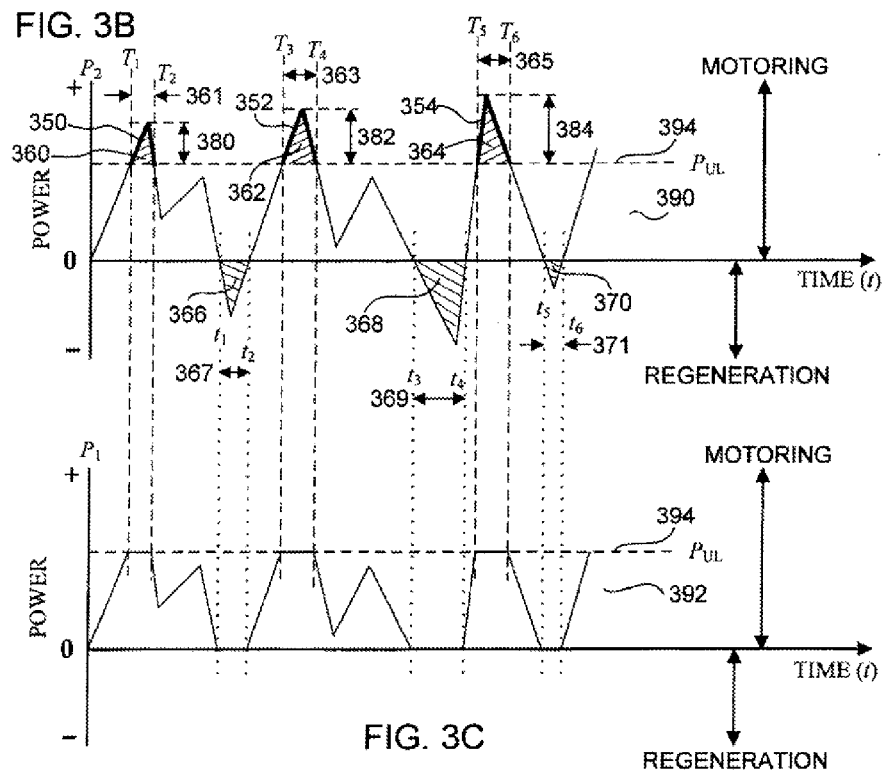
FIG. 3B
FIG. 3C

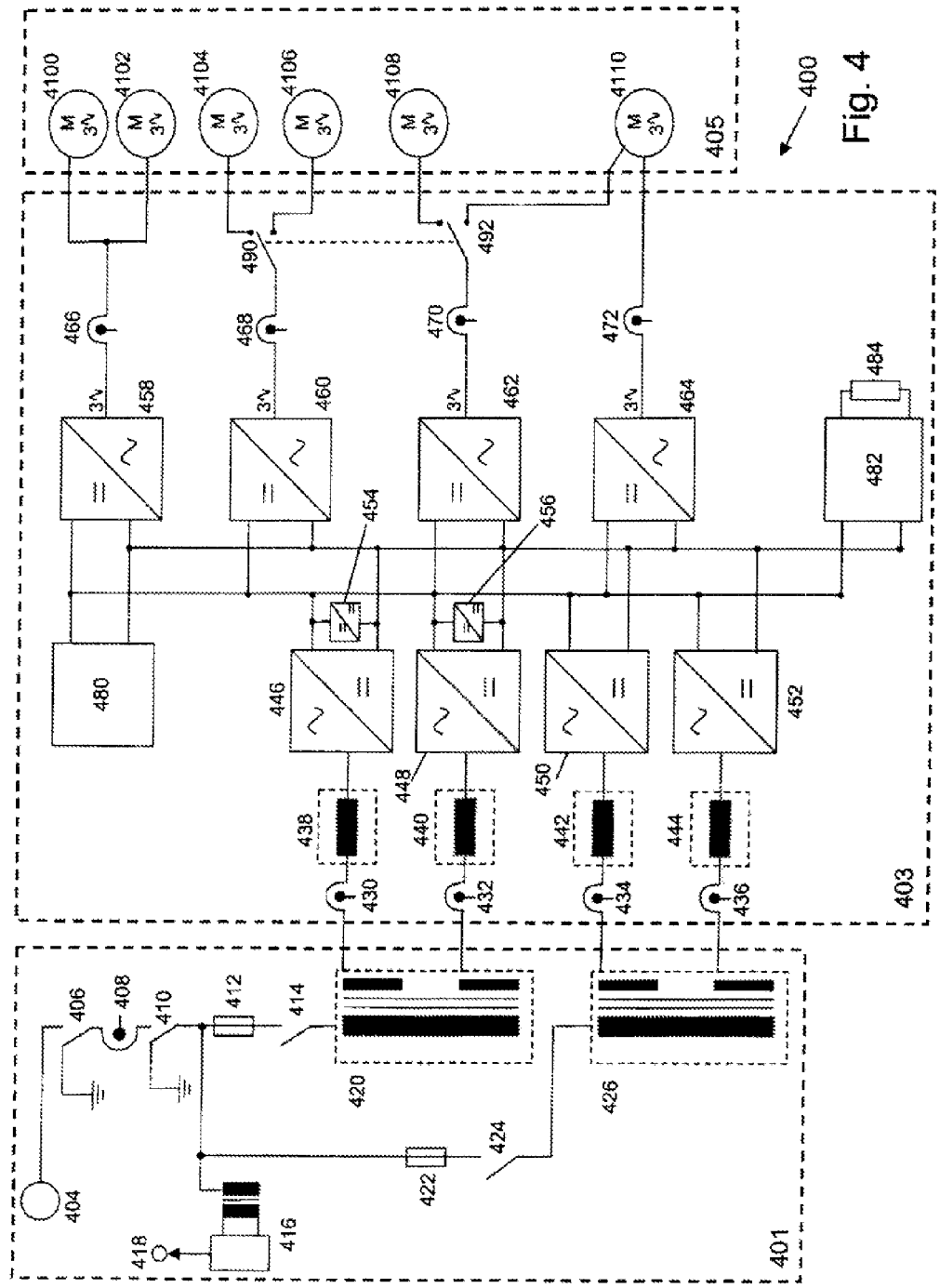

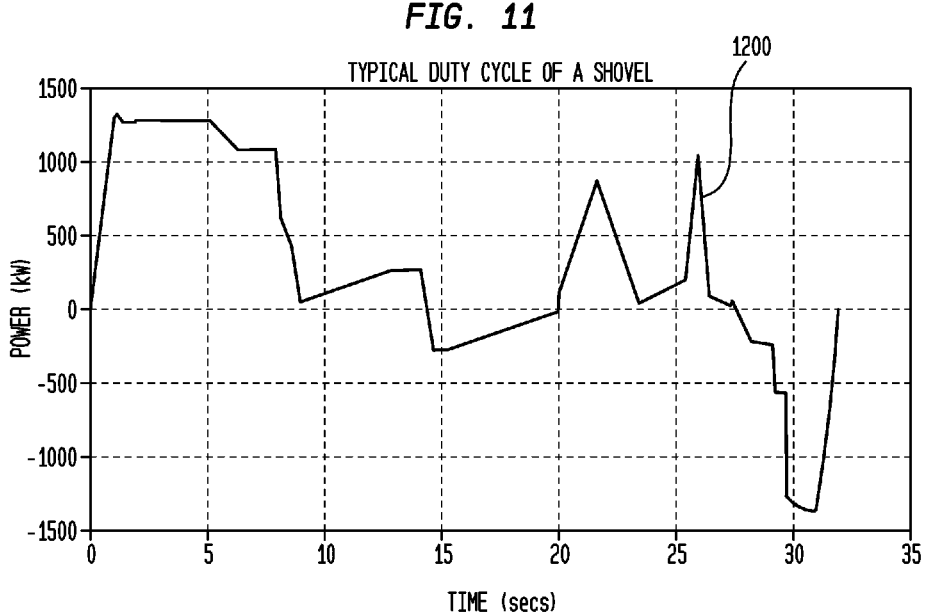
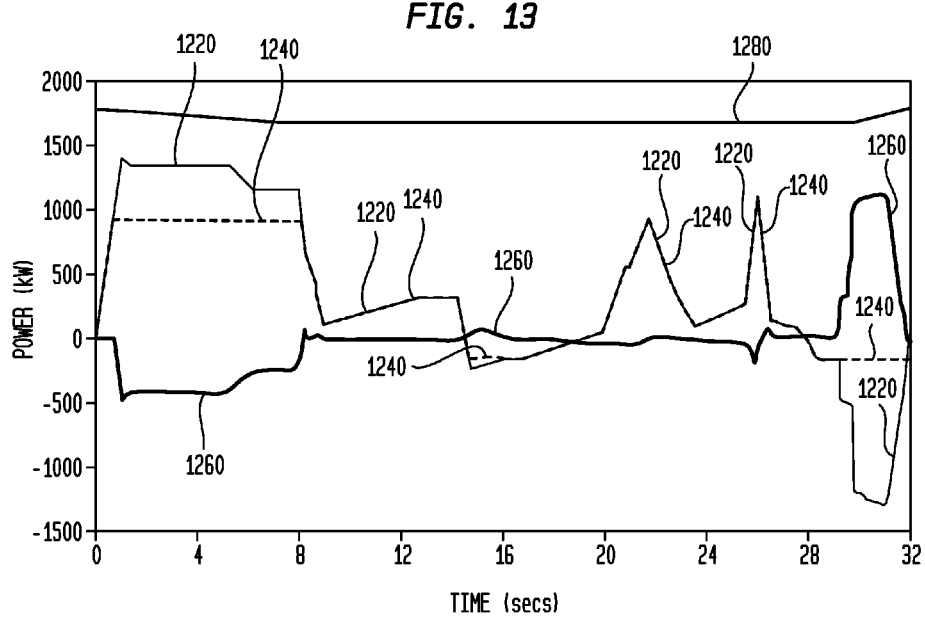

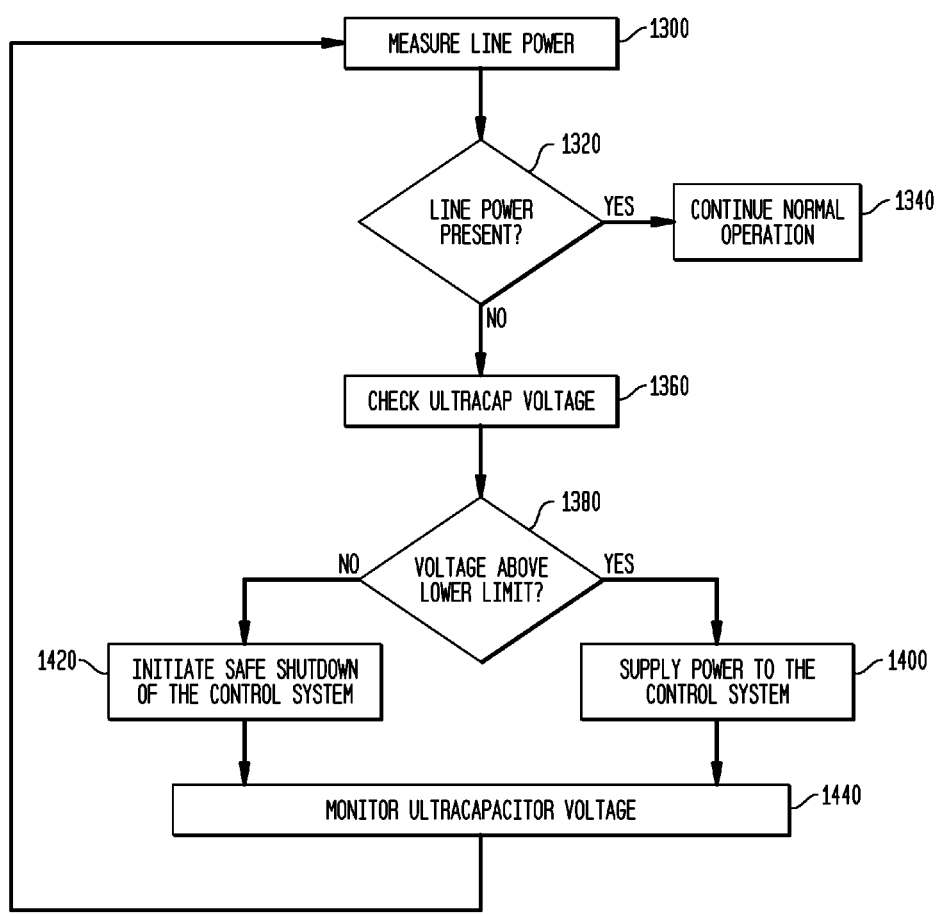

FIG. 14

| DEVICE NAME | POWER REQUIRED -P (W) | TOTAL NUMBER -NT | NUMBER OF SIMULTANEOUS OPERATIONS-N | SIMULTANEOUS OPERATION POWER- Ps=P*N (W) | DURATION -T(hr) | ENERGY REQUIREMENT- E=Ps*T(W-hr) |
|---|---|---|---|---|---|---|
| INTERLOCKING SOLENOID OF DISCONNECT SWITCH | 7 | 8 | 1 | 7 | 8 | 56 |
| INTERLOCKING SOLENOID OF GROUNDING SWITCH | 7 | 8 | 1 | 7 | 8 | 56 |
| PROTECTION RELAY | 12 | 8 | 1 | 12 | 8 | 96 |
| UV RELEASE | 7 | 8 | 5 | 35 | 8 | 280 |
| AUXILIARY RELAY | 3 | 16 | 1 | 3 | 8 | 24 |
| INDICATOR LIGHT | 5 | 16 | 1 | 5 | 8 | 40 |
| TOTAL ENERGY REQUIRED (W-hr) | | | | | | 552 |

SYSTEM AND METHOD FOR PROVIDING AUXILIARY POWER BY REGENERATION POWER MANAGEMENT IN MOBILE MINING EQUIPMENT

CROSS-REFERENCE TO RELATED APPLICATION

This application is a continuation of U.S. patent application Ser. No. 13/033,898 filed on Feb. 27, 2011 entitled SYSTEM AND METHOD FOR PROVIDING AUXILIARY POWER BY REGENERATION POWER MANAGEMENT IN MOBILE MINING EQUIPMENT, which is a continuation-in-part of U.S. patent application Ser. No. 12/466,722 filed on May 15, 2009 entitled LIMITING PEAK ELECTRICAL POWER DRAWN BY MINING EXCAVATORS which are both incorporated herein by reference in their entirety.

FIELD OF THE INVENTION

The present invention relates generally to electrical power systems for mobile mining equipment such as mining excavators and off road haul trucks, and more particularly, to an electrical power system which uses energy stored in an energy storage system as auxiliary power source for various mobile mining equipment electric and electronic systems.

BACKGROUND OF THE INVENTION

Mobile mining equipment such as mining excavators and off road haul trucks is used during mining operations. Mining excavators such as electric shovels and draglines draw a significant amount of electrical power during mining operations. The power drawn by a mining excavator presents a cyclic load to an electrical power distribution network. The cyclic load may include at least one motoring interval (wherein power is drawn from a power source) and one regenerating interval (wherein power is returned to the power source) Electrical power generated by the mining excavator during the regeneration interval is captured and used to charge an on-board electrical energy storage system.

Mining haul trucks are typically equipped with an electrical drive system that includes electric motors which drive the truck wheels. The haul truck draws electrical power from an electrical generator powered by the truck engine or an overhead trolley line while propelling. During downhill travel, the electric motor brakes and this braking power is captured and used to charge an on-board electrical energy storage system.

The system or device used for energy storage is an important area of concern in mobile mining applications. As an example, mining excavators or haul trucks frequently operate in remote locations with extreme climatic conditions where temperatures may go as low as 20° C. below zero. This puts a severe strain on traditional energy storage systems that utilize batteries and associated systems which are used for backup power for various electronic systems and components in the mining excavator such as computers, displays, control systems, protection systems and others.

As an example, the control power and backup power for gas insulated switchgear (GIS) used in a mining excavator is typically provided by lead-acid DC batteries. Such batteries are sufficient for normal conditions but have substantial disadvantages when used in severe cold weather conditions since the acid in the batteries is susceptible to freezing. In order to avoid this, the batteries are typically stored in a heated compartment. However, if a prolonged power outage occurs the temperature of the compartment is no longer controlled which leads to freezing and ultimately battery failure.

As previously described, the regenerated power produced by an excavator or a haul truck may be stored as energy in an energy storage system. This stored energy could be used to reduce the peak power demanded by the electric motors in an excavator or haul truck. Referring to FIG. 11, a typical duty cycle for an electric shovel is shown as power plot 1200. As can be seen, the power profile for the electric shovel indicates a cycle time of approximately 32 seconds. This indicates that the energy storage system should have the capability to charge and discharge every 32 seconds. However, subjecting a conventional battery to such frequent charge/discharge cycles undesirably reduces battery life. Another disadvantage of using batteries is that they require regular maintenance. In addition to reducing peak power demand, the stored energy could be used as an auxiliary power source for various system critical components like protection system, control system etc.

Alternatively, capacitors have been considered for use in an energy storage system instead of batteries. However, the power requirements of a mining excavator would require the use of very large capacitors. This is undesirable since shovels are mobile machines and size and weight are important parameters in shovel design.

BRIEF SUMMARY OF THE INVENTION

A method for operating an ultracapacitor system used in a mining excavator powered by an power source. The method includes detecting whether a power from the power source is present. Next, a voltage level of the ultracapacitor system is measured if the power is not present. The measured voltage level is then compared with a minimum voltage level for the ultracapacitor system. If the measured voltage level is more than the minimum voltage level, auxiliary power is supplied from the ultracapacitor system to operate mining excavator systems. The auxiliary power may be used to power electronic systems and components such as computers, displays, control systems, gas insulated switchgear and lighting systems.

These and other advantages of the invention will be apparent to those of ordinary skill in the art by reference to the following detailed description and the accompanying drawings.

BRIEF DESCRIPTION OF THE DRAWINGS

FIG. 3A shows a high-level schematic of a cyclic load drawing electrical power from an electrical power source and an electrical energy storage unit;

FIG. 3B shows a plot of the power demand of a cyclic load with regeneration;

FIG. 3C shows a plot of the output power drawn from the electrical power source shown in FIG. 3A corresponding to the plot of power demand shown in FIG. 3B;

FIG. 4 shows a single-line diagram of an electric shovel control system;

FIG. 11 depicts a duty cycle for an electric shovel.

FIG. 12 depicts a method for operating an ultracapacitor bank.

FIG. 13 depicts power plots in accordance with the present invention.

FIG. 14 depicts energy requirements for gas insulated switchgear (GIS).

DETAILED DESCRIPTION

Figure 1:
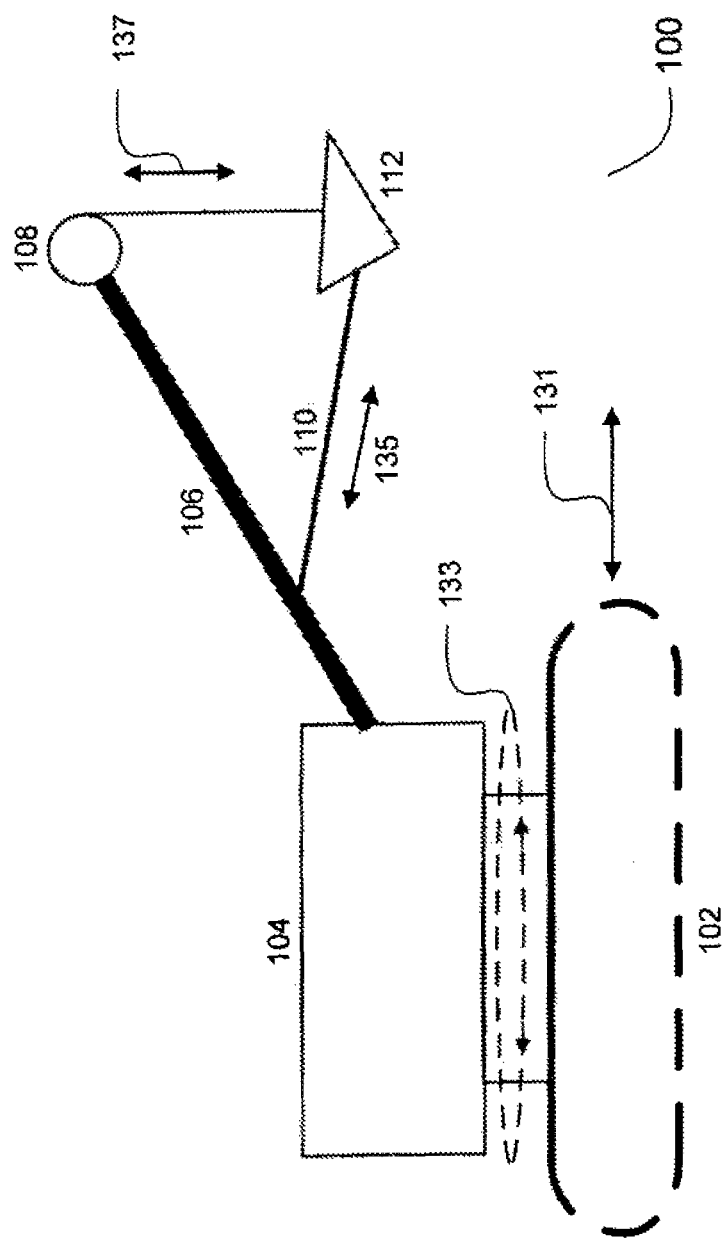
FIG. 1 shows a high-level schematic of an electric shovel.

Mobile mining equipment such as mining excavators and off road haul trucks is used during mining operations. Mining excavators include electric shovels and draglines. FIG. 1 shows a schematic of an electric shovel 100 to illustrate a mining excavator that consumes significant electrical power. The major components are crawler 102, deck 104, boom 106, hoist 108, handle 110, and dipper 112. Electric motors enable various motions to operate the electric shovel 100. Motion 131 propel (forward/reverse directions) refers to travel of the entire electric shovel 100 with respect to the ground. Motion 133 swing (away/return directions) refers to rotation of deck 104 with respect to crawler 102. Motion 135 crowd (crowd/retract directions) refers to positioning of dipper 112 with respect to boom 106. Motion 137 hoist (hoist/lower directions) refers to positioning dipper 112 up and down with respect to the ground. Multiple electric motors may be used to provide each motion.

An electric shovel typically performs a series of repetitive operations. For example, it may propel forward near a bank, swing the dipper into position, crowd the dipper into the bank, hoist the dipper to scoop out material, retract the dipper, propel in reverse to clear the bank, propel forward to a dump site, swing the dipper into position, lower the dipper, and dump the load. It then returns to the bank and repeats the operation. Motors, then, often accelerate in one direction, brake, and accelerate in the opposite direction. The mechanical load on a motor is highly variable. As one example, consider a motor hoisting a dipper full of heavy material, dumping the material, and lowering an empty bucket.

Figure 15:
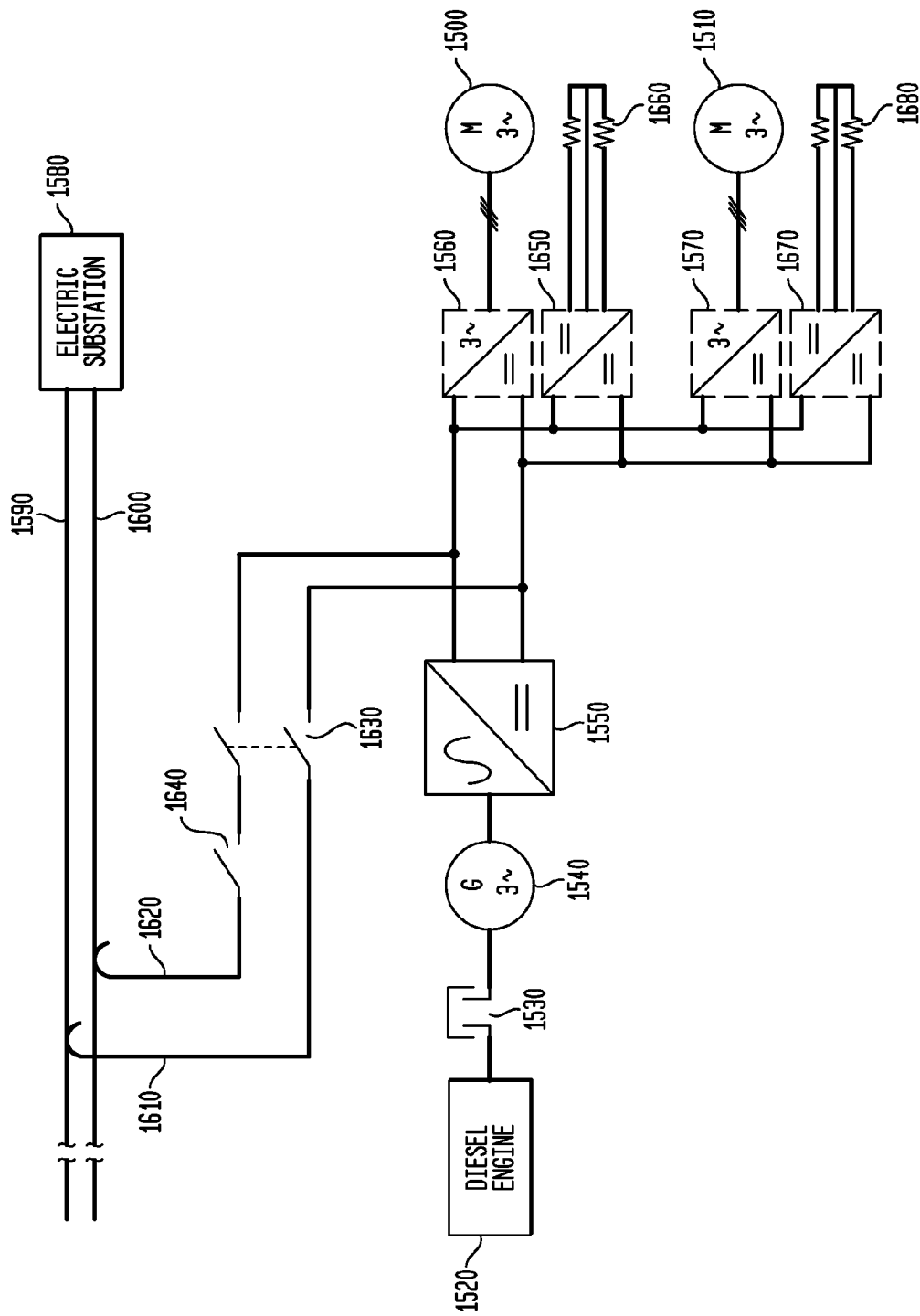
FIG. 15 depicts a single-line diagram of a haul truck power system.

Mining haul trucks are typically equipped with electrical drive motors. FIG. 15 shows a single-line diagram of a haul truck power system including an overhead trolley line power system. The haul truck typically includes two drive wheels. Each wheel is driven by a 3-phase alternating-current (AC) wheel motor (M). The wheel motors are referenced as wheel motor 1500 and wheel motor 1510. Electrical power is supplied by a 3-phase AC generator (G) 206 which is driven by a diesel engine 1520. It is noted that other types of mechanical engines may be used although it is understood that diesel engines are typically used in mining operations. Coupling 1530 connects diesel engine 1520 to generator 1540. Diesel engine 1520 and generator 1540 are mounted on the haul truck. The AC output of generator 1540 is fed into rectifiers 1550. The direct current (DC) output of rectifiers 1550 is fed into a set of inverters 1560 and 1570. Inverters 1560 supply 3-phase AC power to wheel motor 1500. Similarly, inverters 1570 supply 3-phase AC power to wheel motor 1510.

Alternatively, the inputs of inverters 1560 and inverters 1570 may also be connected to DC power supplied by electric substation 1580 via trolley line 1590 and trolley line 1600. Electrical connection of the haul truck to trolley line 1590 and trolley line 1600 is implemented via pantograph arm 1610 and pantograph arm 1620, respectively. Throw switch 1630 connects/disconnects the inputs of inverters 1560 and inverters 1570 to trolley line 1590 and trolley line 1600. There is also an auxiliary breaker 1640. When the haul truck is connected to trolley line 1590 and trolley line 1600 on an uphill grade, a large power demand is placed on the electric substation 1580, resulting in a drop in DC link voltage and increased current flow through trolley line 1590 and trolley line 1600.

The present invention will be described under conditions wherein the entire power requirements for wheel motor 1500 and wheel motor 1510 are supplied by diesel engine 1520 and not by electric substation 1580.

Braking of a haul truck is a critical part of the transport operation. Heavy loads, steep grades, and fast movements result in large quantities of mechanical energy which needs to be managed. Under normal operation, an electrical motor converts electrical energy into mechanical energy. An electrical motor may also be operated in reverse as a generator to convert mechanical energy into electrical energy, which is fed into inverters. In typical dynamic braking systems, braking choppers, connected to the inverters, channel the power into a power resistor grid that continuously dissipates the energy until the truck reaches standstill. Braking is smooth, similar to the braking operation in a car, but without mechanical brake wear. Referring to FIG. 15, for example, chopper 1650 and power resistor grid 1660 provide the braking action for wheel motor 1500. Similarly, chopper 1670 and power resistor grid 1680 provide the braking action for wheel motor 1510. In typical dynamic braking systems, therefore, the regenerated electrical energy (also referred to as retard energy) is converted into waste heat. In embodiments, as described in detail below, however, the regenerated electrical energy is captured and recycled.

The procedure of utilizing the stored energy as an auxiliary power source will be explained with respect to the operation in electric shovels although it is understood that the present invention is also applicable to mining haul trucks.

From an electrical power perspective, an electric shovel presents a cyclic load to an electrical power source. As a function of operating time, the electrical power drawn by the electric shovel varies cyclically. The variation in power may be significant as the average power drawn by these machines may be about 55% of their peak power demand.

Under normal operation, an electric motor converts electrical energy into mechanical energy. An electric motor may also be operated in reverse as a generator to convert mechanical energy into electrical energy. Under normal operation, an electric motor draws (consumes) electrical power from an electrical power source. When an electric motor under motion is stopped, the residual mechanical energy may be converted to electrical energy. Herein, a time interval during which an electrical load is drawing electrical energy is referred to as a motoring interval; and a time interval during which an electrical load is generating electrical energy is referred to herein as a regeneration interval.

Figure 2A:
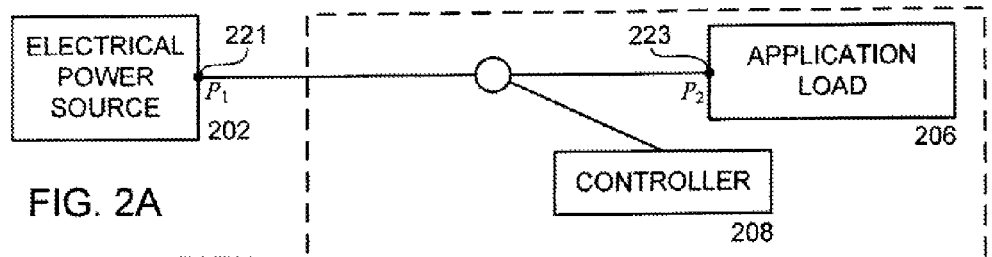
FIG. 2A shows a high-level schematic of a cyclic load drawing electrical power from an electrical power source.

In FIG. 2A, electrical power source 202 feeds total user load 204. In this example, total user load 204 comprises application load 206. Controller 208 controls the electrical power transferred between electrical power source 202 and application load 206. Electrical power $P_1$ 221 represents the output electrical power from electrical power source 202. Electrical power $P_2$ 223 represents the input electrical power drawn by application load 206, which, in this example, is a cyclic load. The input electrical power required to operate a load is also referred to as the electrical power demand of the load.

Figure 2B:
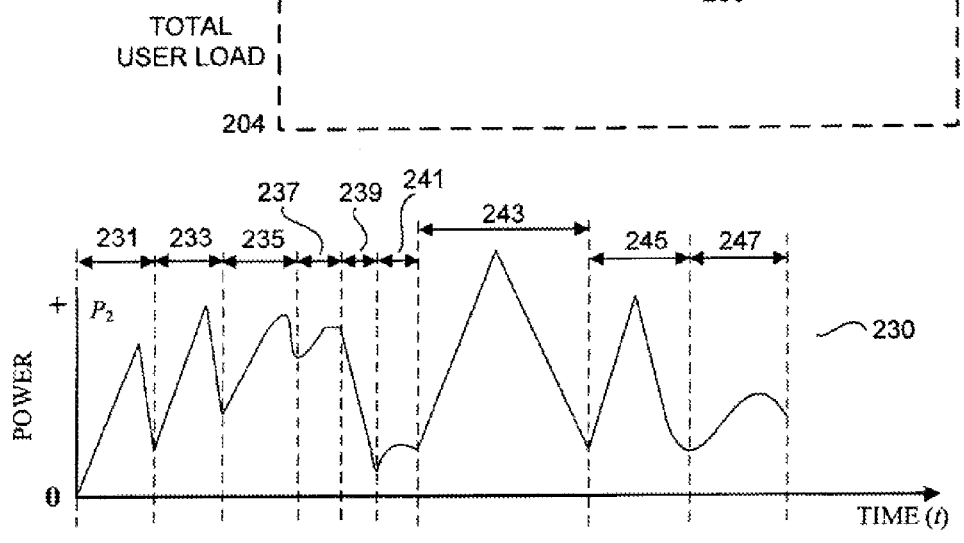
FIG. 2B shows a plot of the power demand of a cyclic load with no regeneration.

FIG. 2B shows plot 230 of the electrical power demand $P_2$ 223 (vertical axis) of application load 206 as a function of time t (horizontal axis). In this example, $P_2$ ranges from zero to positive values. When the electrical power demand is positive, application load 206 is drawing electrical power. Plot 230 is a generic plot used for illustration. The actual power demand is dependent on the specific equipment and operating conditions. For simplicity, many portions of plot 230 are shown as straight line segments. In general, the shape is arbitrary (for example, curvilinear).

In FIG. 2B, cycle 231-cycle 247 are examples of cycles. Note that the cycles are not necessarily strictly periodic. The functional dependence of power vs. time, the amplitude, and the duration of each cycle may vary. In addition to up/down variations, a cycle may include other geometric features, such as a plateau (constant power) in cycle 237 and a cusp in cycle 241.

Figure 2C:
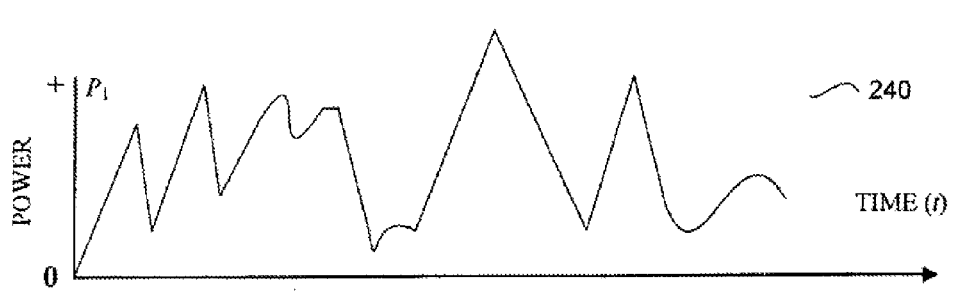
FIG. 2C shows a plot of the output power drawn from the electrical power source shown in FIG. 2A corresponding to the plot of power demand shown in FIG. 2B.

FIG. 2C shows the corresponding plot 240 of the output electrical power $P_1$ 221 (vertical axis) from electrical power source 202. When the output electrical power is positive, electrical power is drawn from electrical power source 202. In the example shown, the output electrical power $P_1$ 221 (plot 240 in FIG. 2C) is equal to the electrical power demand $P_2$ 223 (plot 230 in FIG. 2B).

Figure 2D:
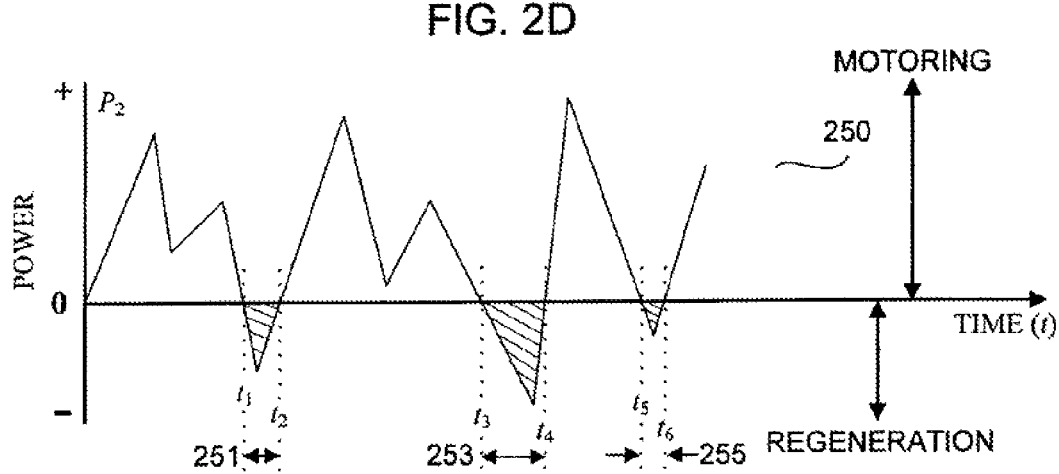
FIG. 2D shows a plot of the power demand of a cyclic load with regeneration.

FIG. 2D shows a different example, plot 250, of the electrical power demand $P_2$ 223 (vertical axis) of application load 206 as a function of time t (horizontal axis). Note that the power ranges from positive to negative values. When the electrical power demand is positive (motoring region), application load 206 is drawing electrical power. When the electrical power demand is negative (regeneration region), application load 206 is generating electrical power. As shown in plot 250, application load 206 generates electrical power during time interval 251 ($t_1 \le t \le t_2$), time interval 253 ($t_3 \le t \le t_4$), and time interval 255 ($t_5 \le t \le t_6$).

Figure 2E:
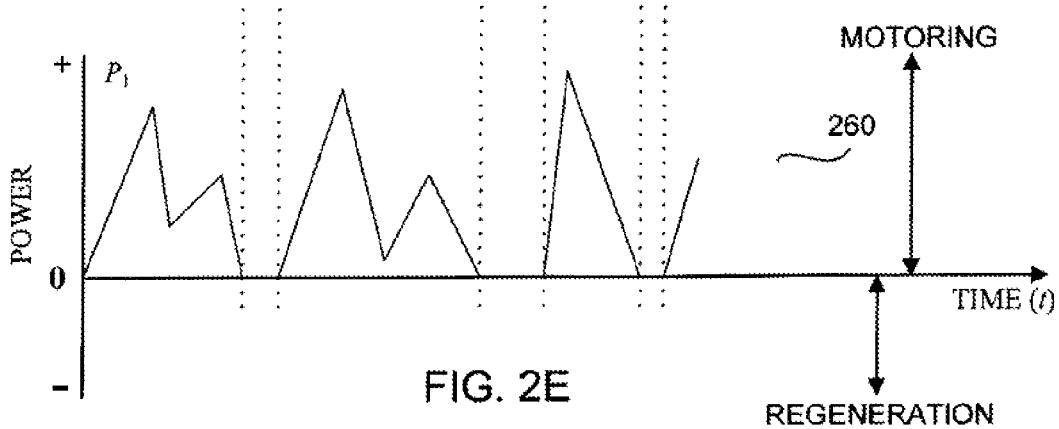
FIG. 2E shows a plot of the output power drawn from the electrical power source in FIG. 2A corresponding to the plot of power demand shown in FIG. 2D.

FIG. 2E shows the corresponding plot 260 of the output electrical power $P_1$ 221 (vertical axis) from electrical power source 202. When the output electrical power is positive, electrical power is drawn from electrical power source 202. When the output electrical power is negative, electrical power is fed back into electrical power source 202. In the example shown, in the motoring region, the output electrical power $P_1$ 221 (plot 260 in FIG. 2E) is equal to the electrical power demand $P_2$ 223 (plot 250 in FIG. 2D). In the regeneration region (time interval 251, time interval 253, and time interval 255), the output electrical power $P_1$ 221 is zero. In this example, the electrical power generated in the regeneration region is fed into a resistor (not shown) and converted to waste heat. The electrical power generated in the regeneration region may also be fed back to electrical power source 202. The output electrical power $P_1$ 221 would then be negative during time interval 251, time interval 253, and time interval 255.

FIG. 3A shows a schematic of an electrical power system, according to an embodiment of the invention, that recaptures the electrical power generated in the regeneration region. Electrical power source 302 feeds total user load 304. In this example, total user load 304 comprises application load 306 and electrical energy storage unit 310. Controller 308 controls the electrical power transferred between electrical power source 302 and application load 306, between electrical power source 302 and electrical energy storage unit 310, and between application load 306 and electrical energy storage unit 310. Electrical power $P_1$ 331 represents the output electrical power from electrical power source 302. Electrical power $P_2$ 333 represents the input electrical power drawn by application load 306, which, in this example, is a cyclic load. Electrical power $P_3$ 335 represents the electrical power generated by application load 306 in the regeneration region. Electrical power $P_4$ 337 represents the electrical power received by electrical energy storage unit 310 from application load 306. Electrical power $P_5$ 339 represents the output electrical power from electrical energy storage unit 310.

An example of electrical energy storage unit 310 is an ultracapacitor, which is characterized by high power densities. For increased electrical energy storage, multiple ultracapacitors may be connected in series and parallel to form an ultracapacitor bank. Electrical current flowing into an ultracapacitor charges the ultracapacitor, and electrical energy is stored via charge separation at an electrode-electrolyte interface. The stored electrical energy may then later be used to output an electrical current. In FIG. 3A, electrical power $P_3$ 335 generated by application load 306 may be fed as electrical power $P_4$ 337 to charge electrical energy storage unit 310. In addition, electrical power $P_1$ 331 output by electrical power source 302 may be fed as electrical power $P_5$ 339 to charge electrical energy storage unit 310.

FIG. 3B shows plot 390 of the electrical power demand $P_2$ 333 (vertical axis) of application load 306 as a function of time t (horizontal axis). Note that, in this example, the power ranges from positive to negative values. When the electrical power demand is positive (motoring region), application load 306 is drawing electrical power. When the electrical power demand is negative (regeneration region), application load 306 is generating electrical power. As shown in plot 390, application load 306 generates electrical power during time interval 367 ($t_1 \le t \le t_2$), time interval 369 ($t_3 \le t \le t_4$), and time interval 371 ($t_5 \le t \le t_6$). Since energy is the integral of power over time, area 366, area 368, and area 370 represent the electrical energy generated by application load 306 during time interval 367, time interval 369, and time interval 371, respectively. This electrical energy is stored in electrical energy storage unit 310.

In an embodiment of the invention, electrical power drawn from electrical energy storage unit 310 is used to reduce peak electrical power drawn from electrical power source 302. FIG. 3C shows the plot 392 of the output electrical power $P_1$ 331 (vertical axis) from electrical power source 302. In this example, the lower limit of $P_1$ 331 is zero. As discussed in examples below, the lower limit may also be greater than zero or less than zero, depending on the cycle and the storage capacity of electrical energy storage unit 310. When the output electrical power is positive, electrical power is drawn from electrical power source 302. When the output electrical power is negative, electrical power is fed back into electrical power source 302. In the example shown, in the motoring region, an upper limit $P_{UL}$ 394 is placed on the output electrical power $P_1$ 331. For values of $P_2<P_{UL}$ (plot 390 in FIG. 3B), $P_2$ is supplied only by $P_1$. For values of $P_2>P_{UL}$, $P_1$ supplies a value of $P_{UL}$. The additional electrical power required is supplied by $P_5$ 339 drawn from electrical energy storage unit 310.

Referring to FIG. 3B, $P_2$ is greater than $P_{UL}$ during time interval 361 ($T_1 \leq t \leq T_2$), time interval 363 ($T_3 \leq t \leq T_4$), and time interval 365 ($T_5 \leq t \leq T_6$). Note that the difference $P_2 - P_{UL}$ are represented by pulses, referenced as pulse 350, pulse 352, and pulse 354, respectively. The pulse amplitudes are referenced as amplitude 380, amplitude 382, and amplitude 384, respectively. The energy drawn within each pulse is referenced as pulse energy 360, pulse energy 362, and pulse energy 364, respectively. As discussed above, energy is represented by area in a power vs. time plot. In the example shown, the pulses have a triangular shape. In general, the pulse shape may vary, depending on the application load and operating conditions and other factors.

In an embodiment of the invention, the electrical energy storage unit 310 is configured such that it may supply all pulse energy required during the operation of application load 306. Parameters to be considered in configuring the electrical energy storage unit 310 include pulse amplitude, pulse width, pulse shape, and time interval between pulses. If $P_3$ is not sufficient to maintain adequate charge in electrical energy storage unit 310, $P_1$ may also be used during off-peak periods to charge electrical energy storage unit 310.

Figure 3D:
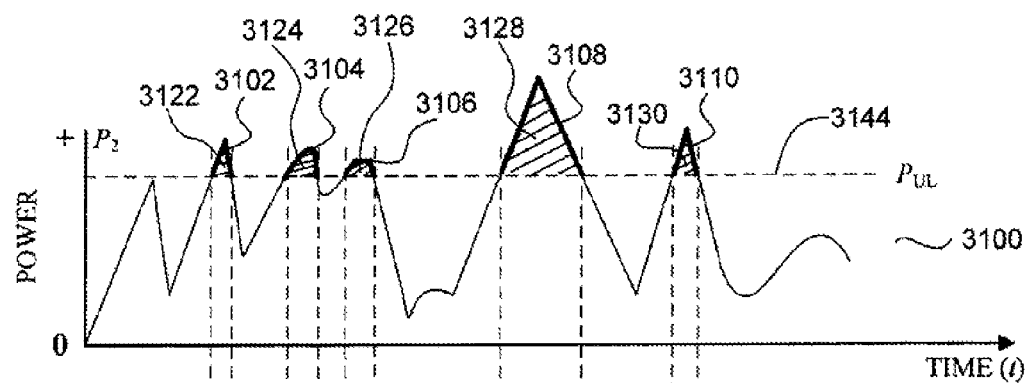
FIG. 3D shows a plot of the power demand of a cyclic load with no regeneration.

In an embodiment of the invention, if application load 306 operates only in the motoring region (no regeneration), electrical energy storage unit 310 may be charged entirely by $P_1$ 331 from electrical power source 302. The charging may occur during off-peak demand to limit the power $P_1$ 331 from electrical power source 302 during peak demand. FIG. 3D shows plot 3100 of the electrical power demand $P_2$ 333 (vertical axis) of application load 306 as a function of time t (horizontal axis). In this example, $P_2$ ranges from zero to positive values. When the electrical power demand is positive, application load 306 is drawing electrical power.

Figure 3E:
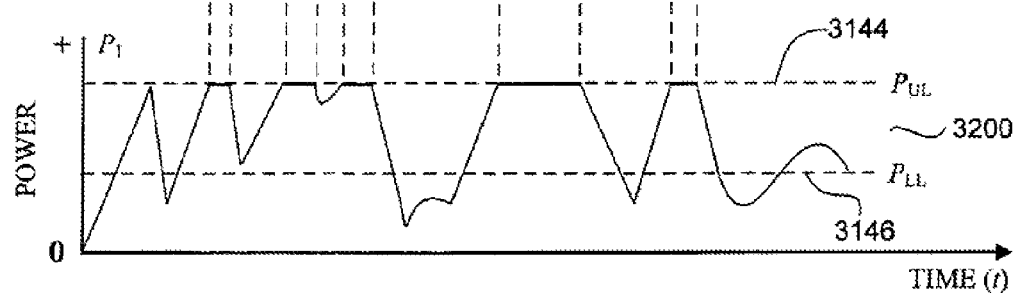
FIG. 3E shows a plot of the output power drawn from the electrical power source in FIG. 3A corresponding to the plot of power demand shown in FIG. 3D.

FIG. 3E shows the plot 3200 of the output electrical power $P_1$ 331 (vertical axis) from electrical power source 302. When the output electrical power is positive, electrical power is drawn from electrical power source 302. In the example shown, an upper limit $P_{UL}$ 3144 is placed on the output electrical power $P_1$ 331. For values of $P_2<P_{UL}$ (plot 3100 in FIG. 3D), $P_2$ is supplied only by $P_1$. For values of $P_2>P_{UL}$, $P_1$ supplies a value of $P_{UL}$. The additional electrical power required is supplied by $P_5$ 339 drawn from electrical energy storage unit 310. In FIG. 3D, note that $P_2>P_{UL}$ for pulse 3102-pulse 3110. The corresponding pulse energies are pulse energy 3122-pulse energy 3130, respectively, which are supplied by electrical energy storage unit 310. Note that a positive lower limit $P_{LL}$ 3146 (FIG. 3E) may be placed on the output electrical power $P_1$ 331. Advantages of maintaining a lower limit are discussed below.

Electrical drive motors used in mining excavators typically operate on 3-phase alternating current (AC). Mining excavators are typically powered from an electrical power distribution network feeding high-voltage AC power through high-voltage armored trail cables to the primary side of a drive power transformer; more than one drive power transformer may be used. A drive power transformer has multiple secondary windings which supply power to a regenerative boost rectifier system through line reactors. Such a rectifier system may comprise active front ends (AFEs). The active front ends are pulse-width modulated isolated gate bipolar transistor (IGBT) rectifiers that convert the incoming AC into direct current (DC) and store the energy in low inductive DC link capacitors. A regenerative rectifier system may also be implemented with silicon-controlled rectifier (SCR) bridges. The number of drive power transformers and the number of active front ends depend on the total power requirement of the drive motors. Power electronic inverters invert the DC voltage available at the DC link to AC voltages that feed the motors.

Electrical energy regenerated by the motors may be fed back to the public utility electrical grid by the active front ends. Under a line side fault condition, however, the active front end may not be able to send back all the regenerated energy to the public utility electrical grid, and the machine needs to shut down. The regenerated energy which could not be fed back to the public utility electrical grid may lead to an increase in the DC link voltage. Since high DC link voltages may damage components, and also pose a safety hazard, protective circuits such as DC choppers and crowbars are added to the system to suppress excessive DC link voltages during regeneration. In this instance, electrical energy is converted to waste heat. As discussed below, in an embodiment of the invention, regenerated electrical energy is stored in an ultracapacitor bank. In another embodiment, the regenerated electrical energy stored in the ultracapacitor bank is used to provide auxiliary power for various systems and devices such as computers, displays, control systems, lighting systems and others.

FIG. 4 shows a single-line diagram of electric shovel control system 400. Block 401 represents input electrical power plant. Block 403 represents electrical power converters. Block 405 represents electrical drive motors.

Referring to block 405, electric shovel 100 is equipped with six electrical drive motors, referenced as motor 4100-motor 4110. Each motor runs on 3-phase alternating current (AC).

In the example shown in block 401, electrical power is directly fed from a public utility electrical power grid via substation 404 supplying 3-phase AC power at a voltage of 3.3 or 6.6 kV. Substation 404 is connected via switch 406 to current transducer 408 and switch 410. Power is supplied via fuse 412 and switch 414 to the primary side of drive power transformer 420. Similarly, power is supplied via fuse 422 and switch 424 to the primary side of drive power transformer 426. Potential transducer 416 generates a synchronizing voltage feedback signal 418.

Referring to block 403, one output from the secondary side of drive power transformer 420 is connected via current transducer 430 and active front end (AFE) choke/reactor 438 to AFE AC-to-DC converter 446. A second output from the secondary side of drive power transformer 420 is connected via current transducer 432 and AFE choke/reactor 440 to AFE AC-to-DC converter 448. Similarly, one output from the secondary side of drive power transformer 426 is connected via current transducer 434 and AFE choke/reactor 442 to AFE AC-to-DC converter 450. A second output from the secondary side of drive power transformer 426 is connected via current transducer 436 and AFE choke/reactor 444 to AFE AC-to-DC converter 452. Output DC voltages are monitored by potential transducer 454 and potential transducer 456.

DC power from the outputs of AFE AC-to-DC converter 446-AFE AC-to-DC converter 452 is fed to the inputs of AFE DC-to-AC inverter 458-AFE DC-to-AC inverter 464. Block 480 represents a ground fault detection circuit. Block 482 represents an overvoltage chopper circuit that dissipates excess electrical energy through resistor 484. The outputs of AFE DC-to-AC inverter 458-AFE DC-to-AC inverter 464 are connected through current transducer 466-current transducer 472, respectively, to motor 4100-motor 4110. Switching drive power between different motors may be performed via transfer switch 490/492.

Figure 5:
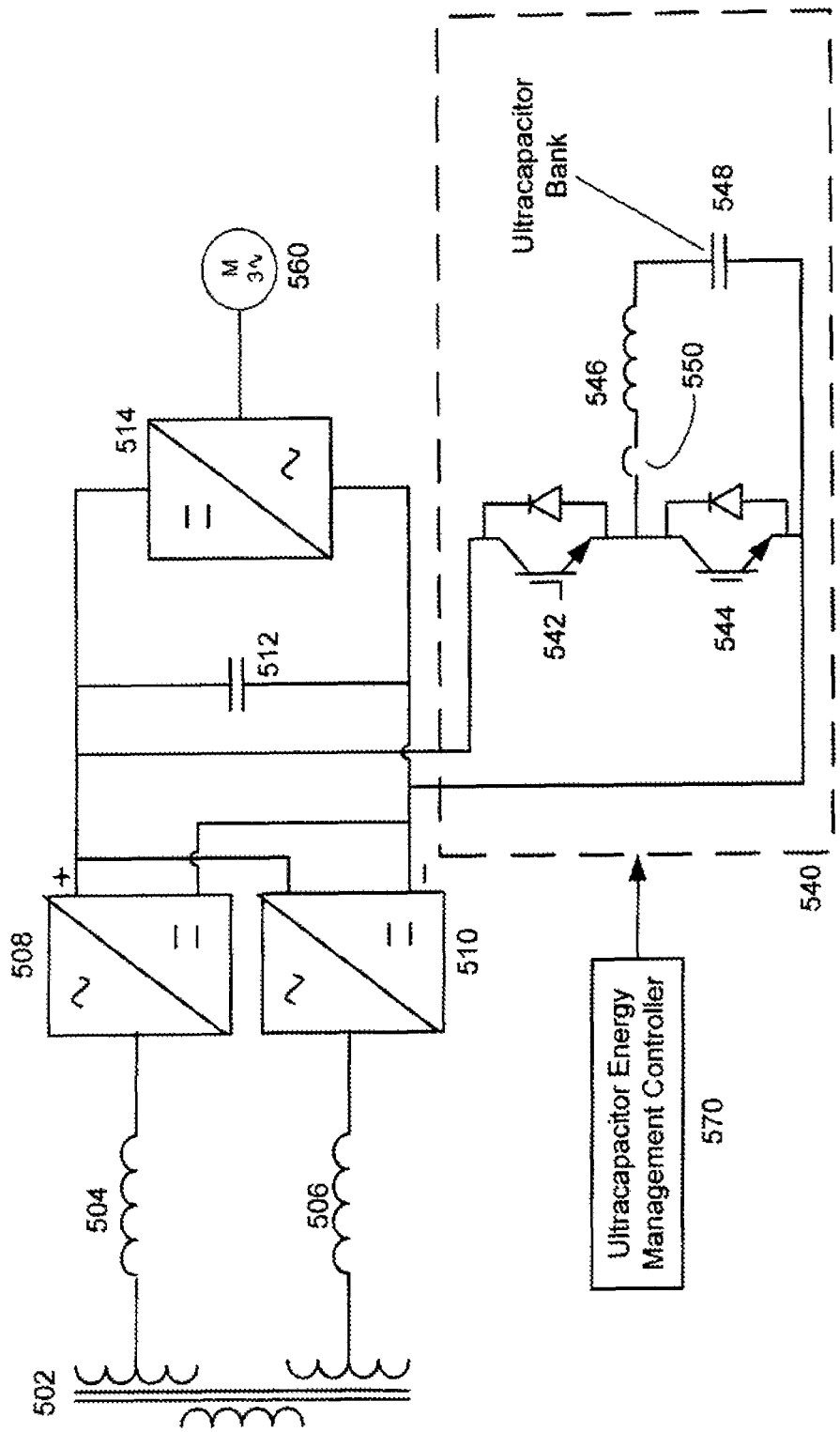
FIG. 5 shows a schematic of an electrical power system with an integrated ultracapacitor bank.

FIG. 5 shows a schematic of an ultracapacitor bank electrical energy storage unit integrated into an existing electrical power converter system. The existing electrical power converter system is represented by drive power transformer 502, AFE choke/reactor 504, AFE choke/reactor 506, AFE 508, AFE 510, DC link 512 and inverter 514. Motor 560 represents a cyclic load. As previously shown in FIG. 4, inverter 514 may feed more than one motor. The ultracapacitor electrical energy storage unit 540 comprises DC-to-DC converter 542/544, choke/reactor 546, and ultracapacitor bank 548. The ultracapacitor electrical energy storage unit 540 may be disconnected from the electrical power converter system via disconnect switch 550. The ultracapacitor electrical energy storage unit 540 is managed by ultracapacitor energy management controller 570.

Figure 6:
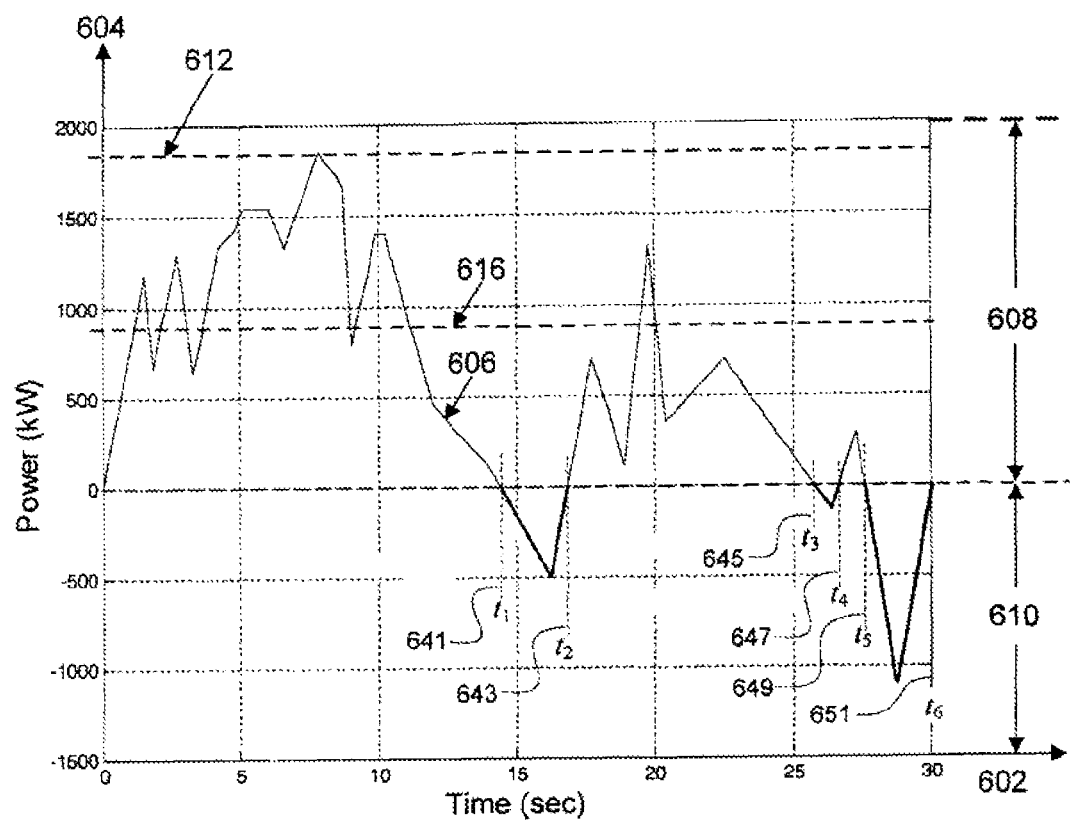
FIG. 6 shows a plot of the power demand of an electric shovel.

Note that a mining excavator with a system of multiple electric motors may be viewed as a single unified cyclic load that operates during motoring intervals and regeneration intervals. The electric shovel 100 in FIG. 1 appears as a cyclic load to the public utility electrical grid governed by a duty cycle. FIG. 6 shows an example of a power cycle for electric shovel 100 over a 30-sec duty cycle. The horizontal axis 602 represents time in seconds (sec). The vertical axis 604 represents power in kilowatts (kW). Plot 606 represents the power demand of electric shovel 100.

In this example, note that on vertical axis 604, the power ranges from positive values to negative values. For positive values, indicated by motoring region 608, the electric shovel 100 is drawing power. For negative values, indicated by regeneration region 610, the electric shovel 100 is generating power. In the duty cycle shown in FIG. 6, there are three time intervals during which electric shovel 100 operates in the regeneration region 610: $t_1$ 641-$t_2$ 643, $t_3$ 645-$t_4$ 647, and $t_5$ 649-$t_6$ 651.

The maximum power demand presented by electric shovel 100 is $P_{max}$ 612. In the standard electrical power converter system, all power is supplied by drive power transformer 502 (FIG. 5). Therefore, in motoring region 608, plot 606 also represents the power supplied by drive power transformer 502. In an embodiment of the invention, the maximum power supplied by drive power transformer 502 is set at a user-defined value $P_{UL}$ 616 (UL=Upper Limit). In an embodiment of the invention, during the time intervals in which peak demand exceeds $P_{UL}$ 616, the power exceeding $P_{UL}$ 616 is supplied by the ultracapacitor bank 546. One skilled in the art may set the value of $P_{UL}$ 616 according to specific equipment and applications.

Figure 7:
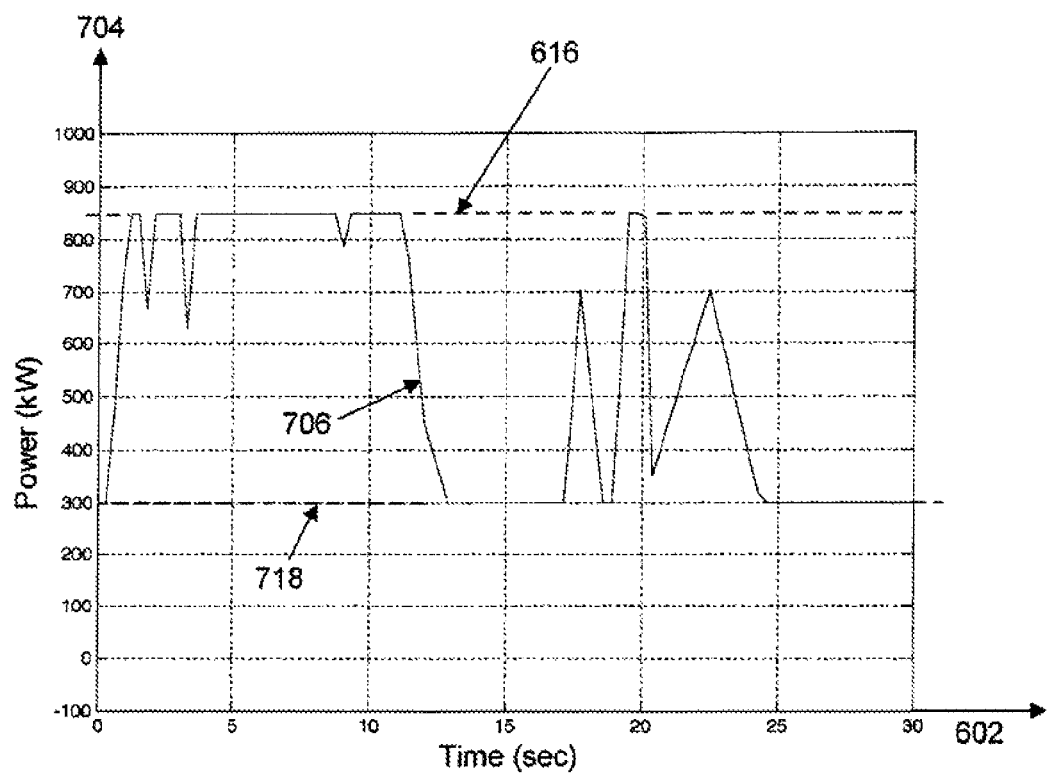
FIG. 7 shows a plot of the output power drawn from an electrical power source when the output power is constrained between an upper limit and a lower limit.

FIG. 7 shows a modified power profile of drive power transformer 502. The horizontal axis 602 represents the 30-sec duty cycle previously shown in FIG. 6. The vertical axis 704 represents power in kilowatts (kW). Plot 706 represents the power delivered by drive power transformer 502. Note that the power falls between $P_{UL}$ 616 and $P_{LL}$ 718 (LL=Lower Limit). The lower limit $P_{LL}$ 718 may be set to zero, a negative value, or a positive value. The lower limit is set to zero if drive power transformer 502 delivers zero power during a regeneration interval, and all regenerated electrical energy is stored in ultracapacitor bank 546. The lower limit is set to a negative value if the capacity of ultracapacitor bank 546 is not sufficient to store all of the regenerated electrical energy: a portion of the regenerated electrical energy is stored in ultracapacitor bank 546, and a portion of the regenerated electrical energy is returned to the public utility electrical grid. The lower limit is set to a positive value (as shown in the example in FIG. 7) if the regenerated electrical energy is not sufficient to fully charge ultracapacitor bank 546: electrical power from drive power transformer 502 is also used to charge ultracapacitor bank 546 during off-peak intervals. Note that line power ripple is decreased as $P_{LL}$ 718 is increased. It is therefore advantageous to set $P_{LL}$ 718 as high as possible, consistent with the duty cycle and voltage of electrical energy storage unit 310. One skilled in the art may set the value of $P_{LL}$ 718 according to specific equipment and applications.

Figure 8:
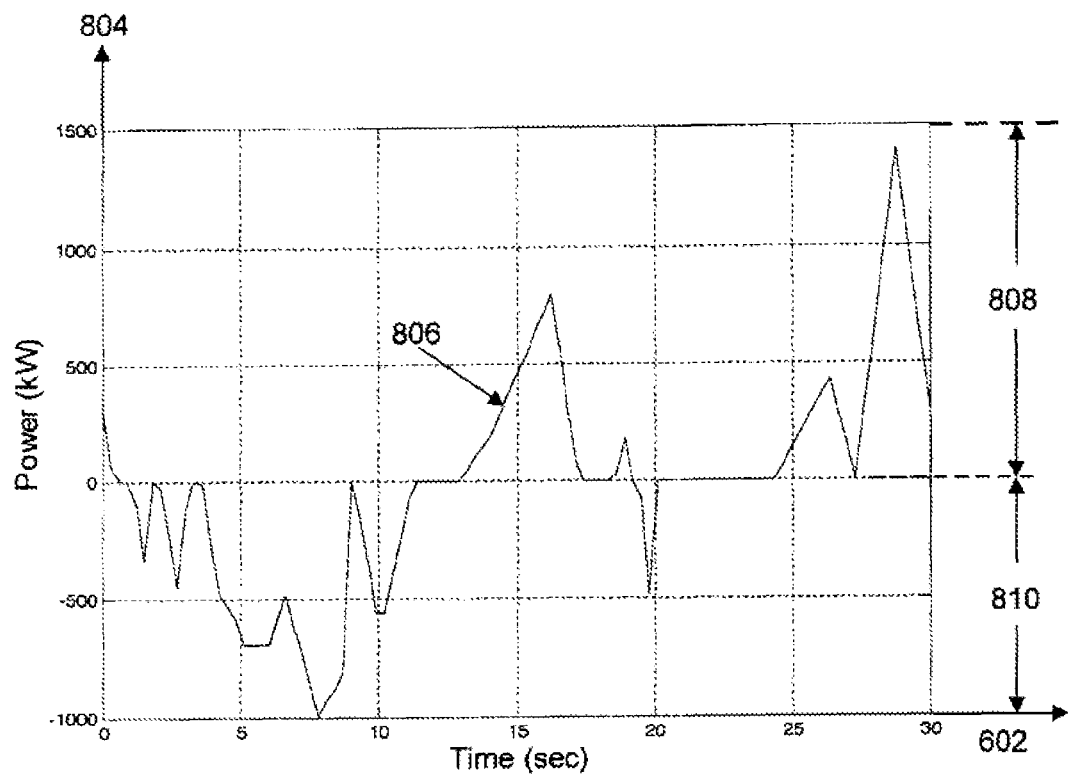
FIG. 8 shows a plot of the output power drawn from an ultracapacitor bank.

FIG. 8 shows the corresponding ultracapacitor power profile. The horizontal axis 602 represents the 30-sec duty cycle previously shown in FIG. 6. The vertical axis 804 represents power in kilowatts (kW). Plot 806 represents the power profile of ultracapacitor bank 546 (FIG. 5). Note that on vertical axis 804, the power ranges from positive values to negative values. For positive values, indicated by regeneration region 808, the ultracapacitor bank 546 is drawing power (charging the ultracapacitor bank). For negative values, indicated by motoring region 810, the ultracapacitor bank 546 is generating power (discharging the ultracapacitor bank).

Figure 9:
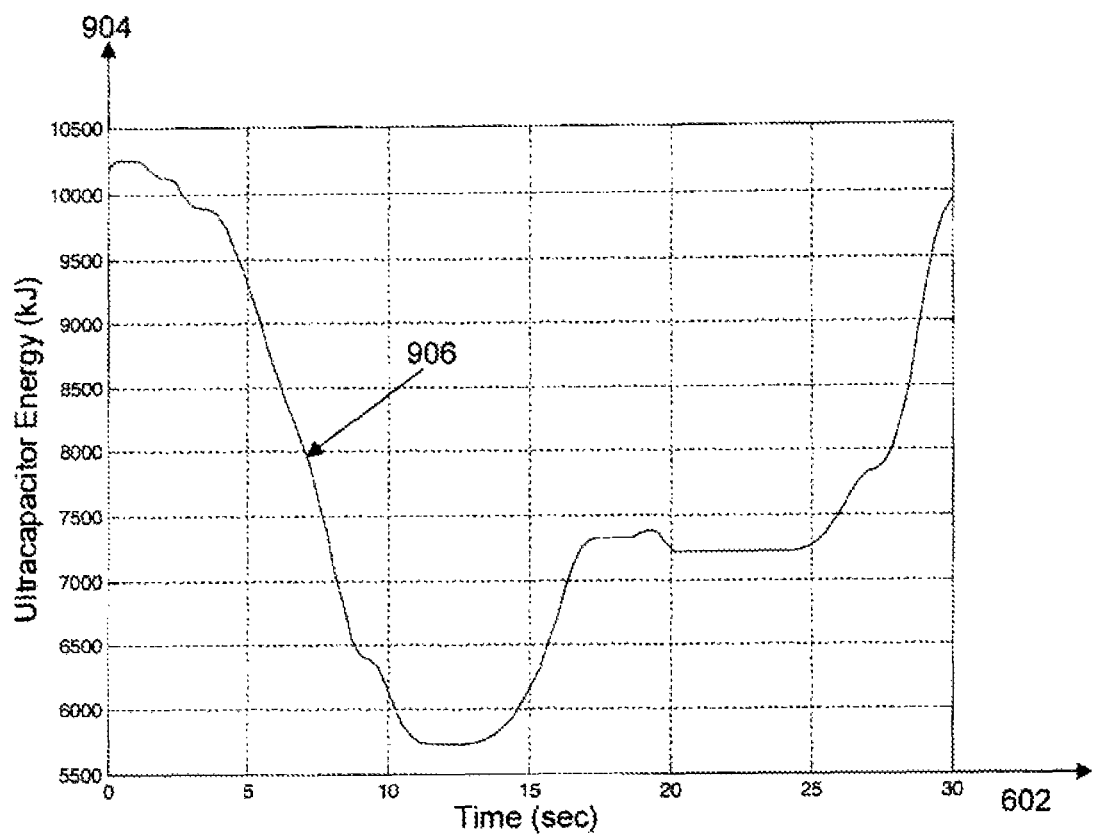
FIG. 9 shows a plot of the stored electrical energy in an ultracapacitor bank.

FIG. 9 shows the energy stored in the ultracapacitor system. The horizontal axis 602 represents the 30-sec duty cycle previously shown in FIG. 6. The vertical axis 904 represents energy in kilojoules (kJ). Plot 906 is calculated by integrating the power (represented by plot 806 in FIG. 8) as a function of time. This data is used for proper sizing of ultracapacitor bank 546. Once the ultracapacitor bank 546 has the required energy stored, additional energy, if available, could be sent back to the public utility electrical grid. As an example, the operating voltage of the ultracapacitor system is approximately 1400 to 1800 volts, and the total capacitance of the ultracapacitor is approximately 4.5 to 9 farads. One skilled in the art may set design requirements for the ultracapacitor system according to specific equipment and applications.

Figure 10:
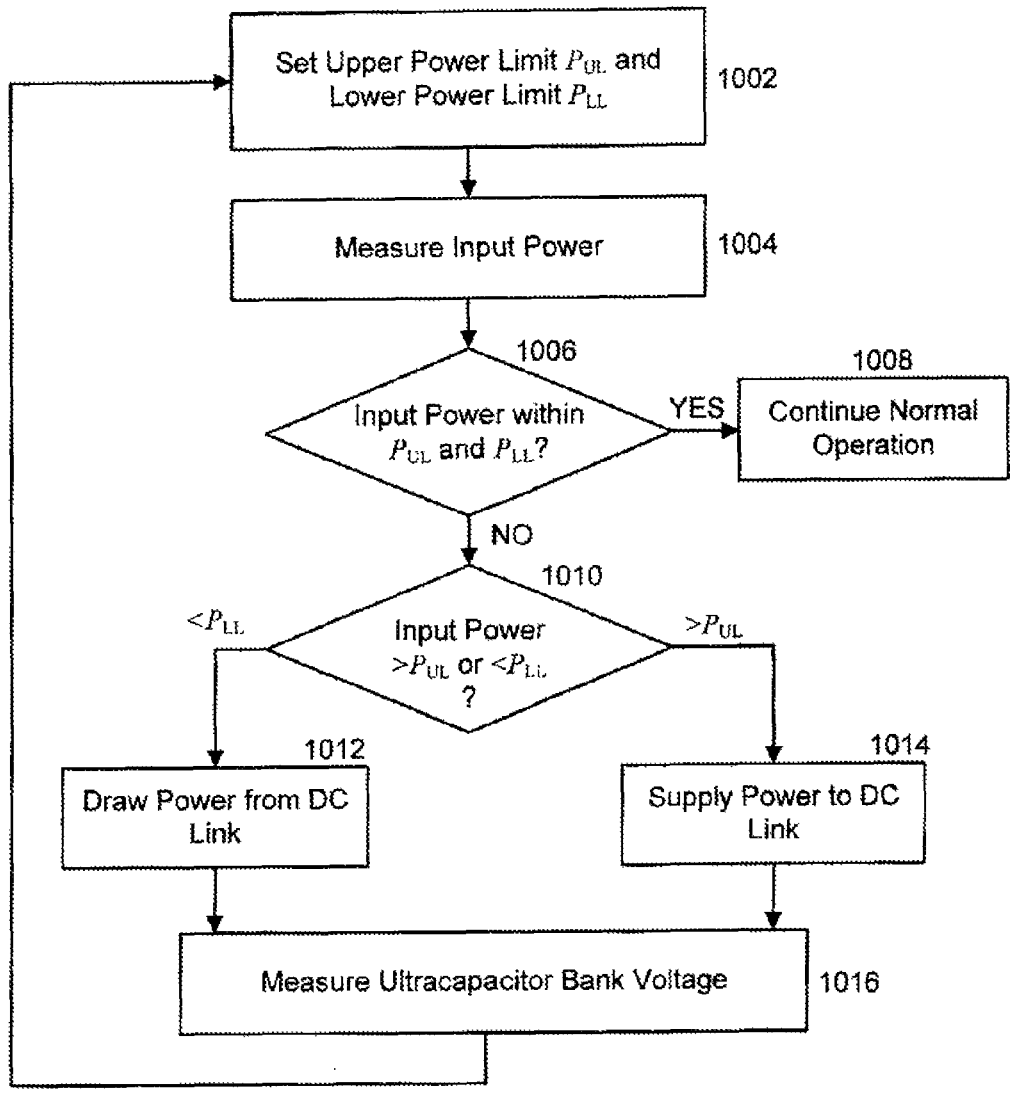
FIG. 10 shows a flowchart of steps for limiting the input power between an upper limit and a lower limit.

FIG. 10 is a flowchart summarizing steps for limiting the power drawn from an electrical power source by a cyclic load. In step 1002, the upper power limit $P_{UL}$ and the lower power limit $P_{LL}$ are set. The process then passes to step 1004, in which the input power drawn by the cyclic load is measured. The process then passes to step 1006, in which the measured input power drawn by the cyclic load is compared to the upper and lower power limits of the electrical power source. If the measured input power drawn by the cyclic load falls within the upper and lower power limits, then the process passes to step 1008, in which normal operation continues. If the measured input power drawn by the cyclic load does not fall within the upper and lower power limits, then the process passes to step 1010, in which the measured input power drawn by the cyclic load is compared to the upper power limit $P_{UL}$ and the lower power limit $P_{LL}$. If the measured input power drawn by the cyclic load is greater than the upper power limit $P_{UL}$, the process then passes to step 1014, in which the ultracapacitor bank supplies power to the DC link. If the measured input power drawn by the cyclic load is less than the lower power limit $P_{LL}$, the process then passes to step 1012, in which the ultracapacitor bank draws power from the DC link. As discussed above, the ultracapacitor bank may be charged from the electrical power source. If the cyclic load operates in both a motoring region and a regeneration region, the ultracapacitor bank may also be charged from electrical power generated by the cyclic load.

Upon completion of either step 1012 or step 1014, the process passes to step 1016, in which the voltage across the ultracapacitor bank is monitored. The process then returns to step 1002, in which the upper power limit and the lower power limit are reset if needed.

In addition to having a very high power density, ultracapacitors are able to withstand a relatively large number of charge-discharge cycles in comparison to conventional batteries. Ultracapacitors are also rated for operation at temperatures as low as 40° C. below zero and are thus more suitable for use in mining operations which take place in severe weather conditions. In accordance with the present invention, the ultracapacitor bank 548 is used to provide auxiliary power for various systems and devices such as computers, displays, control systems, lighting systems and others. The ultracapacitor bank 548 is configured to provide a nominal operating voltage sufficient to enable operation of a mining excavator. During use, the ultracapacitor bank 548 is discharged and the voltage level decreases to a lower voltage limit at which the voltage level is not sufficient to maintain operation of the mining excavator. In one embodiment, the ultracapacitor bank 548 is configured to provide a nominal voltage level of approximately 1800V. In addition, an exemplary lower voltage limit may be approximately 1500V. It has been determined that it takes approximately 8 hours of normal operation of the mining excavator for the voltage level to decrease from 1800V to 1500V. Therefore, in one embodiment ultracapacitor bank 548 holds sufficient energy to provide 8 hours of backup power for various mining excavator electronic systems and components such as computers, displays, control systems, GIS, lighting systems and others. This eliminates the need for conventional batteries as a source of backup power, thus increasing reliability.

Referring to FIG. 12, a method for operating the ultracapacitor bank 548 is shown. At step 1300, line power is measured by the potential transducer 416 described in relation to FIG. 4. If line power is present at step 1320, normal operation of the mining excavator continues at step 1340. If line power is not present at step 1320, the potential transducer 454 (see FIG. 4) then checks the voltage level of the ultracapacitor bank 548 at step 1360. If the voltage level is above the voltage lower limit at step 1380, then power is supplied to the ultracapacitor energy management controller 570 at step 1400. If the voltage level is below the voltage lower limit at step 1380, then the mining excavator control system is shutdown at step 1420. After both steps 1400 and 1420, the voltage level of the ultracapacitor bank 548 is monitored at step 1440 by the potential transducer 454. The line voltage is again checked at step 1300.

The maximum permissible power supplied by AFE 508 and AFE 510 (see FIG. 5) in motoring and regeneration mode has to be considered in order to optimize the peak power of the system. With respect to FIG. 11, the maximum motoring power to be supplied by the AFE 508 and AFE 510 is selected as PMAX=950 MW, while the maximum regenerated power that can be fed back by the AFE to the grid is selected as PMIN=−200 MW. The extra regenerated power is used to charge the ultracapacitor bank 458 which is rated at 1800V, for example. The DC-to-DC converter 542/544 serves to exchange power between DC link 512 and the ultracapacitor bank 458. Applying the above conditions, the power-time graph is presented in FIG. 13 for the profile of FIG. 11. In particular, FIG. 13 depicts a power demand plot 1220, a line power plot 1240 which coincides with portions of the power demand plot 1220, a ultracapacitor power plot 1260 and ultracapacitor voltage plot 1280. From FIG. 13, the total regenerative energy that can be captured by the ultracapacitor bank 458 is determined to be approximately 2 MJ by calculating the integral of power.

Referring to FIG. 14, Table 1 lists important items in a GIS which require backup. It is determined that the energy requirement for GIS backup systems is approximately 2 MJ. Hence, the total energy requirement for the ultracapacitor bank 458 is approximately 4 MJ. From simulation the peak current requirement of the ultracapacitor bank 458 is found to be 300 Amps. From these data the cost and size of the ultracapacitor bank 458 may be estimated.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for operating an ultracapacitor system used in a mining excavator powered by a power source, comprising:
   detecting whether a power from the power source is present; and
   based on detecting that the power is not present:
   measuring a voltage level of the ultracapacitor system;
   comparing a measured voltage level with a minimum voltage level for the ultracapacitor system; and
   based on comparing that the measured voltage level is more than the minimum voltage level, supplying auxiliary power from the ultracapacitor system to operate mining excavator systems.

2. The method according to claim 1 further including stopping operation of the mining excavator if the measured voltage is less than the minimum voltage level.

3. The method according to claim 1 wherein the ultracapacitor system is configured to provide approximately 8 hours of normal operation.

4. The method according to claim 1 wherein the minimum voltage level is 1500V.

5. The method according to claim 1 wherein a nominal voltage for the ultracapacitor system is approximately 1800V.

6. The method of claim 1, further comprising charging the ultracapacitor system with power drawn from the power source.

7. The method of claim 1, wherein the power source comprises at least one of a connection to an electrical power grid and a diesel engine.

8. The method of claim 1, wherein the power source outputs three-phase alternating current with a minimum voltage of at least one kilovolt.

9. The method of claim 8, wherein the minimum voltage is at least three kilovolts.

10. The method according to claim 1 further comprising:
    monitoring a power draw of the mining excavator; and
    based on monitoring that the power draw is above a maximum power level and that the measured voltage level is more than the minimum voltage level, supplying power from the power source and auxiliary power from the ultracapacitor system to operate the mining excavator.

11. A method for operating an ultracapacitor system used in a mining excavator powered by a power source, comprising:
    operating the mining excavator to provide a cyclic load;
    charging the ultracapacitor system with power generated by the cyclic load during a regeneration interval;
    detecting whether a power from the power source is interrupted; and based on detecting that the power is interrupted:
measuring a voltage level of the ultracapacitor system;
comparing a measured voltage level with a minimum voltage level for the ultracapacitor system; and
based on comparing that the measured voltage level is more than the minimum voltage level, supplying auxiliary power from the ultracapacitor system to operate mining excavator systems.

12. The method of claim 11, further comprising charging the ultracapacitor system with power drawn from the power source.

13. The method of claim 11, wherein the power source comprises at least one of a connection to an electrical power grid and a diesel engine.

14. The method of claim 11, wherein the power source outputs three-phase alternating current with a minimum voltage of at least one kilovolt.

15. The method of claim 14, wherein the minimum voltage is at least three kilovolts.

16. The method according to claim 11 further comprising:
monitoring a power draw of the mining excavator; and
based on monitoring that the power draw is above a maximum power level and that the measured voltage level is more than the minimum voltage level, supplying power from the power source and auxiliary power from the ultracapacitor system to operate the mining excavator.

17. The method according to claim 11 further including stopping operation of the mining excavator if the measured voltage is less than the minimum voltage level.

18. The method according to claim 11 wherein the ultracapacitor system is configured to provide approximately 8 hours of normal operation.

19. The method according to claim 11 wherein the minimum voltage level is 1500V.

20. A method for operating an ultracapacitor system used in a mining excavator powered by a power source, comprising:
monitoring a power draw from the power source of the mining excavator; and
based on monitoring that the power draw is above a maximum power level:
measuring a voltage level of the ultracapacitor system;
comparing a measured voltage level with a minimum voltage level for the ultracapacitor system; and
based on comparing that the measured voltage level is more than the minimum voltage level, supplying power from the power source and auxiliary power from the ultracapacitor system to operate the mining excavator.

* * * * *